United States Patent Office 3,720,652
Patented Mar. 13, 1973

3,720,652
POLYMERIC COMPOSITION WITH ANTI-STATIC AND ANTI-FOGGING PROPERTIES
Yoshiharu Yagi, Minoru Hino, Takanobu Noguchi, Motomu Wada, Kiyoshi Yasuno, Kou Sota, Nobuo Ito, and Yasuto Nakai, Osaka, Japan, assignors to Sumitomo Chemical Co., Ltd., Osaka, Japan
No Drawing. Filed July 8, 1970, Ser. No. 53,297
Claims priority, application Japan, July 8, 1969, 44/54,309
Int. Cl. C08f 45/00
U.S. Cl. 260—80.7
2 Claims

ABSTRACT OF THE DISCLOSURE

A polymeric composition with anti-static and anti-fogging properties comprising a polymer (for example, a polyolefin, such as polyethylene, polypropylene, and the like; a copolymer of ethylene and a polar vinyl compound, such as a copolymer of ethylene and vinyl acetate, a copolymer of ethylene and vinyl chloride, a copolymer of ethylene and an acrylic acid ester, and the like; an ABS resin; a polystyrene, or a synthetic rubber, such as SBR, BR and EPDM), and at least one of N-(2-hydroxyethyl)stearylamine and N-(2-hydroxyethyl)oleylamine or a mixture of at least one of N-(2-hydroxyethyl)stearylamine and N-(2-hydroxyethyl)oleylamine and at least one of N,N-bis-stearyl-2-ethanolamine and N,N-bis-oleyl-2-ethanolamine is disclosed.

BACKGROUND OF THE INVENTION

(1) Field of the invention

The present invention relates to a polymeric composition having anti-static and anti-fogging properties. More particularly, the present invention relates to a polymeric composite material with anti-static and anti-fogging properties comprising a polymer (e.g., a polyolefin such as polyethylene, polypropylene, and the like; a copolymer of ethylene and a polar vinyl compound, such as a copolymer of ethylene and vinyl acetate, a copolymer of ethylene and vinyl chloride, a copolymer of ethylene and acrylic acid ester, and the like; a so-called ABS resin (i.e., a thermoplastic resin consisting of acrylonitrile, butadiene, and styrene); a polystyrene; a synthetic rubber such as SBR (i.e., styrene-butadiene rubber), BR (i.e., butadiene rubber), and EPDM (i.e., ethylene-propylene-diene terpolymer)) and an anti-static agent.

(2) Description of the prior art

In general, high molecular weight materials or high polymers are used widely as polymeric composite materials for forming films, moldings, fibers, tires, and the like, and have excellent electric insulation characteristics, but have the disadvantages that the materials have the tendency to be charged statically. This results in various difficulties and accidents. Furthermore, it frequently occurs that the surface of such plastics is contaminated due to static electricity. Accordingly, it is very important in practical use to prevent the plastics from being charged statically.

Also, sheets or films of polyethylene, polypropylene, or a copolymer of ethylene and vinyl acetate are used as agricultural sheets and packing films for vegetables and meats. Since the surfaces of such sheets and films are almost completely hydrophobic, water attached to or condensed on the surfaces results in clouding. Due to this phenomenon the light transmittance or the transparency of the agricultural sheets, which are used as building materials for greenhouses, is greatly reduced. Also, water droplets condensing on the inside surface of the sheet fall down as droplets without flowing down along the surface thereof. This obstructs the growth of the plants cultivated. Packaging films for vegetables and meats also suffer due to the clouding. This makes the film opaque and hence it is impossible to observe the contents. Therefore, it is also very important, as in the case of providing an anti-static property to the surfaces of the sheets and films, to prevent the sheets and films from the formation of clouding by water or to provide to the surface of the sheets and films with the property of preventing the growth of water drops on the surface thereof (hereinafter, such property is called "anti-fog porperty").

Compounds, hitherto known, capable of providing such anti-static effects and anti-fog properties to plastics by incorporating them in the plastics are various cationic, anionic, nonionic and amphoteric surface active agents.

However, use of these known anti-static surface active agents depends upon the chemical structures of them, that is, use of these known surface active agents as anti-static agents for resins is restricted in each compound. For example, since an ABS resin or a polystyrene is generally subjected to melt molding at a high temperature, generally known anti-static agents have the tendency of being pyrolyzed and coloring the resins, whereby discoloration of the resin is promoted and, in polystyrene, the transparency thereof is reduced.

On the other hand, when an anti-static agent is applied to a polyolefin and the polyolefin is molded into a film, and the like, it is necessary that these moldings have surface properties, such as anti-blocking properties and slipping properties besides the anti-static properties. Generally speaking, of the anti-static agents industrially used at present, cationic and/or amphoteric surface active agents are excellent in their anti-static effects but inferior in thermal stability. Conversely, nonionic surface active agents may be excellent comparatively in thermal stability but are insufficient in their anti-static effects.

A secondary or tertiary amine having the general formula

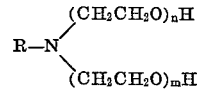

wherein R represents a long chain aliphatic group and $n+m$ is an integer larger than 1, prepared by bonding ethylene oxide to a primary aliphatic amine, is known to provide anti-static effects to various kinds of plastics. Many examples are known in which such anti-static agents are applied to plastics, such as polyolefins, together with other additives. As the additives used together with the anti-static agents there are illustrated fatty acids, fatty amides and inorganic salts.

As the result of the extensive studies on the methods of producing the anti-static agents shown by the aforesaid general formula, it has been confirmed that they are produced by the addition reaction of ethylene oxide to primary amines. In such an addition reaction, the addition of ethylene oxide to the two active hydrogens of the primary amine occurs almost simultaneously and it is extremely difficult to replace one hydrogen atom and leave the second hydrogen atom. Also, when the compound, ethylene oxide having been added thereto, is formed, the addition reaction to the terminal group of the hydroxyethyl group occurs readily and the long chain of the oxyethylene is formed. Since the compounds represented by the above described general formula are produced as mentioned above, the product in many cases is a mixture of the compounds having the above-described structure in which $n+m$ is larger than 2.

Therefore, the anti-static power of the product appears to be as a result of the sum of the anti-static powers of the compounds in the mixture. No results of comparative studies of the anti-static power of each of these compounds have ever been reported.

The inventors have isolated separately in the pure state the various compounds corresponding to the above-described general formula and evaluated the anti-static powers of each of the compounds. As the results thereof, it has been found that they are generally insufficient for practical use, e.g., some of the compounds are inferior in anti-static power and some of the compounds are insufficient in thermal stability for plastics. However, as the result of further detailed studies, the inventors have discovered that among these compounds N-(2-hydroxyethyl) stearylamine and N-(2-hydroxyethyl)-oleylamine have a very excellent anti-static power, as well as other various excellent properties, such as heat stability and coloring resistance. Furthermore, it has also been discovered that when a small amount of a tertiary amine, prepared by substituting a proton on the nitrogen of the above-described primary amines by long chain alkyl groups such as stearyl groups or oleyl groups, e.g., N,N-bis-stearyl-2-ethanolamine or N,N-bis-oleyl-2-ethanolamine, is present in a specific system together with the above-described amines, a synergistic effect is obtained.

SUMMARY OF THE INVENTION

Thus, the present invention relates to a polymeric composite material comprising a polyolefin, such as polyethylene or polypropylene; a copolymer of ethylene and a polar vinyl compound, such as a copolymer of ethylene and vinyl acetate, a copolymer of ethylene and vinyl chloride, or ethylene and an acrylic acid ester; a so-called ABS resin (i.e., a thermoplastic resin consisting of acrylonitrile, butadiene and styrene); a polystyrene; or a synthetic rubber such as SBR (i.e., styrene-butadiene rubber), BR (i.e., butadiene rubber), EPDM (i.e., ethylene-propylene-diene methylene linkage) and an anti-static agent or an anti-fog agent (hereinafter, these agents are simply called anti-static agents);

(1) at least one of N-(2-hydroxyethyl)stearylamine and N-(2-hydroxyethyl)oleylamine, or (2) a mixture in a desired ratio of at least one of N-(2-hydroxyethyl)stearylamine and N-(2-hydroxyethyl)oleylamine and at least one of N,N-bis-stearyl-2-ethanolamine and N,N-bis-oleyl-2-ethanolamine.

DETAILED DESCRIPTION OF THE INVENTION

The important feature of this invention is that one of the ingredients of the anti-static components has one hydrogen atom on the nitrogen atom and it can be effectively used together with a tertiary amine, such as N,N-bis-long chain alkyl-2-ethanol-amine without suffering any deleterious influence therefrom.

The number of carbon atoms in the long chain alkyl group bonded to the nitrogen atom of the amine used in this invention is at least 18 and if the carbon atom number is 12, 8 or less than, a sufficient anti-static effect cannot be obtained and further the thermal stability of the amine is greatly reduced.

Furthermore, the amine in which the hydrogen atom at the nitrogen atom thereof has been substituted by a hydroxyethyl group or a lower alkyl group, such as a methyl group or an ethyl group, shows insufficient anti-static power and hence is unsuitable for the purposes of this invention.

The anti-static agents of this invention can be incorporated into a high molecular weight material or a polymer using conventional techniques.

For example, the anti-static agent or agents can be added to a polymer before or during the polymerization thereof, but, in general, it is preferable to add the anti-static agent or agents to the powder or particles of the polymer after the polymerization thereof. In some types of polymers or high molecular weight compounds, the anti-static agent or agents can be dispersed well in the polymer by kneading the mixture of the anti-static agent and the polymer in the molten state. In the discussion herein, a single antistatic agent or more than one anti-static agent can be used.

The amount of anti-static agent preferably ranges from 0.1 to 5% by weight, based on the weight of the polymer. If the amount is larger than 5% by weight, the surface properties of the polymer containing it, e.g., the sense of touch, openability, and the like, are degraded.

The high molecular weight material or the polymer having the anti-static agent incorporated therein can be molded or fabricated by widely employed molding methods, such as press molding methods, injection molding methods, or extrusion molding methods. Moreover, spraying or coating of a solution of the anti-static agent onto the surface of the molded resin article also yields the anti-static effect.

The following examples are intended to illustrate the present invention but not to limit it in any way.

EXAMPLE 1

In a 1,000 ml. four-necked flask equipped with a stirrer, a reflux condenser, a dropping funnel, and a thermometer was charged 420 g. of monoethanolamine. After the air in the flask was replaced with nitrogen gas, 360 g. of stearyl chloride was added dropwise over a period of about 3 hours to the monoethanol amine through the dropping funnel with stirring at 190° C. Thereafter, the mixture was maintained at this temperature for 1 hour and then cooled to a temperature lower than 100° C. and then the upper layer, thus formed, was recovered and washed twice with 40% aqueous methanol which was previously heated to 70–80° C. The layer thus washed was dried under a reduced pressure, and 358 g. of a white waxy product, having a melting point of 50–53° C., was obtained. The total amine value and the tertiary amine value of the product were 154 and 31, respectively. Further, the product was distilled under a reduced pressure, and 244 g. of N-(2-hydroxyethyl)stearylamine having a melting point of 57.0–57.5° C. was obtained. The total amine value thereof was found to be 175 (calculated 179).

A mixture of 0.5 g. of the distilled compound prepared as above and 100 g. of polypropylene, Noblen S–101 (registered trade name, made by the Sumitomo Chemical Co.) was roll-milled for 10 minutes at 190° C. The milled mixture was hot-pressed for 10 minutes at a pressure of 50 kg./cm.$^2$ at 210° C. to give a sheet which was used as a test sample for measurement of the surface resistibility, the static charge, and the carbon-stainability.

The surface resistibility of the sample was obtained by measuring, after humidifying a 40 x 40 x 1 mm. sample under the standard conditions of 20° C. in temperature and 65% in relative humidity (other properties than the surface resistibility were also measured under the same standard conditions) for 10 days, the one minute value by means of an Ultra Megohm Meter SM–10 (made by the Doa Denpa Kogyo K.K.) after applying a potential of 500 volts to the electrodes in the meter. Also, the static charge was obtained by applying a potential of 10,000 volts to a 40 x 50 x 1 mm. sample and then measuring the statically charged potential (relative value) and the half life of charge decay by means of a Static-Honest Meter (made by the Shishido Shokai).

The carbon stainability was obtained by visual examination of the extent of surface contamination of a 40 x 50 x 1 mm. sample using a Dirt-Chamber (made by the Ueki Kosaku-Sho). The contamination degree was classified in five steps of from A to E with A corresponding to the least contamination degree, and E corresponding to the most serious contamination degree.

Also, the thermal stability of the sample was evaluated by testing the weight loss on heating as follows. About 3 g. of the sample was charged in a weighing bottle having a volume of 15 ml. and after heating the sample for 15 minutes in an oven at 200° C. and further for 15 minutes at 300° C., the weight loss of the sample due to volatilization or decomposition was measured and expressed as a percentage of the weight of the sample before heating.

The results of the measurements described above on the samples containing the anti-static agent of this invention as well as several compounds of a chemically similar structure are shown in Table 1 together with reference samples containing commercially available anti-static agents similar to series above.

EXAMPLE 2

Polypropylene, Noblen FL-116 A (registered trade name, made by the Sumitomo Chemical Co.) was mixed with a solution of 50 g. of the anti-static agent prepared in Example 1 in methanol for 10 minutes at 50° C. using a super mixer and then dried for 3 hours at 70° C. The mixture was extruded at 210–240° C. using an extruding machine having a diameter of 40 mm. into a tubular film of 0.05 mm. in thickness. The anti-static property of the film, thus formed, was compared with that of a reference sample containing a commercially available nonionic anti-static agent. The results are shown in Table 2.

TABLE 1

| | Anti-static agent | Surface resistibility ($\Omega$) | Static honest meter | | Carbon contamination, degree | Weight loss by heating | |
|---|---|---|---|---|---|---|---|
| | | | Static charged potential (relative value) | Half life of charged decay (sec.) | | 200° C., percent | 300° C., percent |
| Compound according to the present invention. | n-$C_{18}H_{37}$—N(H)(CH$_2$CH$_2$OH) | $6.6 \times 10^{10}$ | 61 | 2.0 | A | 0.15 | 4.37 |
| | n-$C_{12}H_{25}$—N(H)(CH$_2$CH$_2$OH) | $4.8 \times 10^{11}$ | 64 | $\infty$ | A/B | 3.20 | 15.55 |
| | n-$C_8H_{17}$—N(H)(CH$_2$CH$_2$OH) | $1.1 \times 10^{16}$ | 64 | $\infty$ | D | 12.51 | 99.30 |
| Reference compounds | n-$C_{18}H_{37}$—N(CH$_2$CH$_2$OH)$_2$ | $2.3 \times 10^{16}$ | 65 | $\infty$ | D | 1.09 | 5.90 |
| | n-$C_{18}H_{37}$—N(CH$_3$)(CH$_2$CH$_2$OH) | $3.3 \times 10^{14}$ | 66 | $\infty$ | E | 1.12 | 6.64 |
| Commercially available compounds | Alkylamine ethyleneoxide adduct (A). | $3.0 \times 10^{14}$ | 65 | $\infty$ | D | 2.87 | 8.67 |
| | Alkylamine ethyleneoxide adduct (B). | $5.7 \times 10^{13}$ | 65 | $\infty$ | D | 5.92 | 24.24 |
| Control | | $1.0 \times 10^{16}$ | 64 | $\infty$ | D | | |

TABLE 2

| Anti-static agent | Tubular film | Static charge/half life of charge decay (second) | | | Ash test | | | Surface resistibility ($\Omega$) | | |
|---|---|---|---|---|---|---|---|---|---|---|
| | | 1 day | 3 days | 10 days | 1 day | 3 days | 10 days | 3 days | 5 days | 10 days |
| Article of the present invention | Outer surface | 51/2 | 52/4 | 45/1 | 0 | 0 | 0 | $2.4 \times 10^{11}$ | $1.7 \times 10^{11}$ | $1.1 \times 10^{11}$ |
| | Inner surface | 54/9 | 55/16 | 53/45 | 0 | 0 | 0 | | | |
| Reference [1] | Outer surface | 50/<200 | 60/165 | 60/1 | 25 | 5 | 0 | $3.7 \times 10^{12}$ | $6.7 \times 10^{11}$ | $2.6 \times 10^{11}$ |
| | Inner surface | 59/<200 | 59/<200 | 55/<200 | 40 | 10 | 0 | | | |
| Control | Outer surface | 58/$\infty$ | 61/$\infty$ | 61/$\infty$ | 40 | 50 | 60 | $7.2 \times 10^{15}$ | $1.1 \times 10^{16}$ | $9.6 \times 10^{15}$ |
| | Inner surface | 58/$\infty$ | 61/$\infty$ | 60/$\infty$ | 65 | 45 | 60 | | | |

[1] Commercially available anti-static agent comprising an ester of N,N-di(2-hydroxyethyl)stearylamine as the main component.

As is clear from the results shown in Table 1 above, the weight loss on heating of the sample containing N-(2-hydroxyethyl)stearylamine used in this invention was less than that of the reference sample containing the N,N-bis-(2-hydroxyethyl)stearylamine which is considered to be a conventionally typical anti-static agent. That is, the sample of this invention was excellent in heat resistance in comparison with the reference sample. Moreover, the samples of this invention were considerably better in surface resistibility, in half life of charge decay, and in carbon stainability in comparison with the reference samples.

As can be seen from the results shown in Table 2 the anti-static agent of this invention showed excellent anti-static power and that the effect was observed immediately. With respect to the surface properties of the film of this invention, the anti-blocking property, the slipping property and the clarity of the film were similar to or better than those of the reference sample containing the commercially available anti-static agent.

The ash test was conducted as follows: the test film was placed in a flat plate, the surface of film was rubbed softly with a gauze, and then the distance at which an ash, prepared by burning a paper, began to be attracted by electrostatic force was measured, which is expressed in millimeters.

EXAMPLE 3

A mixture of 5 kg. of an ethylene-vinyl acetate copolymer, Evatate H–2011 (registered trade name, made by the Sumitomo Chemical Co.) and 25 g. of the anti-static agent prepared in Example 1 was milled using a Banbury mixer, treated with a sheeting roller, and pelletized using a pelletizer. Thereafter, the pellets were molded at 130° C. into an inflation film of 0.05 mm. in thickness using an extrusion molding machine having a diameter of 50 mm.

The film had good transparency which was the same as that of a film containing no such anti-static agent.

After storing the film in a chamber at a temperature of 20° C. and at a relative humidity of 65% for 4 days, the antistatic property of the film was measured.

The surface resistivity, the static charge/half life, and the ash test of the film of this invention were $1.6 \times 10^{11} \Omega$, 64/11 sec., and 0 mm., respectively, while those of a film containing no such anti-static agent were $7.5 \times 10^{15} \Omega$, 67/$\infty$, and 65 mm., respectively.

EXAMPLE 4

From 244 g. of monoethanol amine and 144 g. of stearyl chloride, according to a similar procedure described in Example 1, 152 g. of a white waxy product having a melting point of 51–53° C. was obtained. The primary amine value was 0 and the tertiary amine value was 18.6. By calculating the weight ratio of the components in the product from these amine values, the product was confirmed to contain 78.1% by weight of N-(2-hydroxyethyl)stearylamine (hereinafter called "monoalkylamine") and 21.9% of N,N-bis-stearyl-2-ethanolamine (hereinafter called "dialkylamine"). Then, 71 g. of the crude product were distilled under a reduced pressure, and 45 g. of N-(2-hydroxyethyl)stearylamine was obtained. The melting point and amine value of the product was 65° C. and 178 (calculated 179) respectively.

A mixture of 100 g. of high density polyethylene, Hi-Zex 2208J (registered trade name, made by the Mitsui Chemical Co.) and 1.2 g. of the (N-(2-hydroxyethyl)stearylamine obtained above was roll-milled at 170° C. and the mixture was hot-pressed for 10 minutes at a pressure of 50 kg./cm.$^2$ and at a temperature of 190° C. to provide a sample.

Also, a sample was prepared in a similar manner using the crude product before distillation, that is, the mixture of 78.1% of the monoalkylamine and 21.9% of the dialkylamine.

The anti-static power of the sample thus prepared was measured (see footnote to Table 3 for sample description and test description). The results are shown in Table 3 together with the anti-static power of the anti-static agent with other high density polyethylenes.

TABLE 3

| Anti-static agent | Surface resistivity ($\Omega$) | (a) (b) | (c) | (d) | (e) |
|---|---|---|---|---|---|
| Sample (A) | $6.4 \times 10^{10}$ | 56.0 | 2.0 | A | (1) |
| Do | $6.4 \times 10^{10}$ | 44.5 | 10 | A | (2) |
| Sample (B) | $2.9 \times 10^{10}$ | 57.0 | 12.0 | A/B | (1) |
| Do | $1.6 \times 10^{11}$ | 51.0 | 8.0 | A/B | (2) |
| No agent (control) | $>10^{16}$ | 59.0 | $\infty$ | E | (1) |
| Do | $>10^{16}$ | 64.0 | $\infty$ | E | (2) |

NOTE.—Samples (A) and (B) anti-static agents of this invention; Sample (A) is a mixture of 78% of the monoalkylamine and 22% of the dialkylamine and Sample (B) is the pure monoalkylamine. Test evaluations are: (a) static charge evaluation; (b) charged potential; (c) half life of charge decay; (d) carbon contamination degree; (e) high density polyethylene; (1) Hi-Zex 2208J made by the Mitsui Chemical Co., and (2) Sholex 5008 made by the Showa Denko Co.

As can be seen from the results given in Table 3, Sample (B), which was the pure product obtained by distillation, and Sample (A), which was a mixture of the monoalkylamine and the dialkylamine, both showed sufficient anti-static power. It was particularly noted that the anti-static power of Sample (A) for the polymers was better than that of the Sample (B), which shows the synergistic effect of the monoalkylamine and the dialkylamine.

EXAMPLE 5

A specific amount of each of the purified product and the crude mixture of the monoalkylamine and the dialkylamine, prepared in Example 4, was dry-blended with polypropylene, Noblen H–101 (registered trade name, made by the Mitsui Chemical Co.) and the mixture was pelletized. The pellets were molded using an injection molding machine to provide a sample. The surface resistibility, the static charge, the half life of charge decay, and the ash test of the samples were measured. The results are shown in Table 4 together with those of a reference sample containing a commercially available anti-static agent.

TABLE 4

| Anti-static agent | Addition amount (PHR)[1] | Surface resistibility ($\Omega$) | Static honest meter | | Ash adhering distance (mm.) |
| | | | Static charge potential | Half life of charge decay | |
|---|---|---|---|---|---|
| Sample: | | | | | |
| (A) | 0.8 | $3 \times 10^{11}$ | 50 | 2 | [2] |
| (B) | 0.5 | $1 \times 10^{12}$ | 45 | 3 | [2] |
| (B) | 0.8 | $3 \times 10^{11}$ | 40 | 1 | [2] |
| Reference[3] | 0.8 | $3 \times 10^{12}$ | 55 | 3 | 5 |
| Control | | $>10^{16}$ | 60 | $\infty$ | 35 |

[1] Parts per hundred parts of resin.
[2] Not adhere.
[3] Commercially available anti-static agent comprising an ester of N, N-di(2-hydroxyethyl)stearylamine as the main component.

In Table 4, Sample (A) was a mixture of 78% of the monoalkylamine and 22% of the dialkylamine and Sample (B) was the pure monoalkylamine.

As is clear from the results shown in Table 4, the anti-static agents of this invention gave excellent effects even when the amount used was small and in this example both Sample (A), which was the mixture of the monoalkylamine and the dialkylamine, and Sample (B), which consisted of the pure monoalkylamine, showed similarly excellent effects.

In the above tests, the ash test was conducted as follows: the surface of the sample was rubbed 50 times with a gauze and the distance at which ash, prepared by burning a paper, began to be attracted by electrostatic forces, shown in millimeter. Other tests were the same as those described in Example 1.

EXAMPLE 6

From 244 g. of monoethanolamine and 143 g. of oleyl chloride, 145 g. of a colorless and transparent liquid was obtained according to a procedure similar to that described in Example 1. The total amine value, the tertiary amine value and the primary amine value of the product were 144, 20.0 and 0, respectively. By calculating the weight ratio of the components in the product from these amine values, the product liquid was confirmed to contain about 68.9% of the monoalkylamine, i.e., N-(2-hydroxyethyl)oleylamine and 31.1% of the dialkylamine, i.e., N,N-bis-oleyl-2-ethanolamine.

A mixture of 100 g. of polypropylene, Noblen S–101 (registered trade name, made by the Sumitomo Chemical Co.), and 0.5 g. of the product was roll-milled for 10 minutes at 180° C. and the milled mixture was hot-pressed for 10 minutes at a pressure of 50 kg./cm.$^2$ and a temperature of 210° C. to provide a sheet.

The results on evaluation of the properties of the sample, according to the manner described in Example 1, showed that the surface resistibility, the static charge, the half life of charge decay, and the carbon contamination degree were $8.5 \times 10^{10} \Omega$, 60, 4 seconds, and A respectively, showing excellent anti-static effects with the agents of this invention.

EXAMPLE 7

A dry-blended mixture of 100 g. of an EVA resin, Evatate H-2011 (registered trade name, made by the Sumitomo Chemical Co.) and 0.5 g. of the mixture of the monoalkylamine and the dialkylamine prepared in Example 4 was molded using an extruder to provide an inflation film of about 75 microns in thickness. By measuring the static charge, the half life of charge decay, and the ash-attraction power of the sample, the anti-static property and anti-fog property of the sample were evaluated.

The static charge of the sample, 4 days after molding, was 55, the half life of charge decay was 1 second, and no ash was attracted when the ash test, as described in Example 4, was conducted. On the other hand, the static charge, the half life of charge decay, and the ash-attraction power of a film containing no such anti-static agent were 60, ∞, and 75 mm. respectively.

The evaluation of the anti-fog property was conducted as follows: the sample film was attached to a 1 liter beaker, containing about 800 ml. of water, such that the stretched film sealed the mouth of the beaker. The film was placed outdoors at an inclination of about 20° to the horizontal and the surface condition of the film was observed after about 1 month. The results showed that a film containing no additive of this invention is greatly inferior in transparency due to the condensation of vapor on the surface of the film, whereas the surface of the film containing the additive of this invention was uniformly wetted with water unaccompanied with any condensation of vapor on the surface thereof. The surface maintained good anti-fog properties even after one month under severe summer conditions.

EXAMPLE 8

From 196 g. of monoethanolamine and 116 g. of stearyl chloride, 238 g. of a white waxy product was obtained according to a procedure similar to that described in Example 1. The melting point of the product was 52–53° C. and the total amine value, the tertiary amine value, and the primary amine value thereof were 155.2, 25.5 and 0, respectively. From these amine values the composition of the product was calculated to be 59% by weight of the monoalkylamine, i.e., N-(2-hydroxyethyl)stearylamine and 38% by weight of the dialkylamine, i.e., N,N-bis-stearyl-2-ethanolamine.

A mixture of 100 parts by weight of an ABS resin, Kralastic (registered trade name, made by the Sumitomo Chemical Co.) and 1 or 2 parts by weight of the compound prepared as above was roll-milled together with a specific amount of stabilizer. The blended mixture was molded using a vertical-type injection molding machine to provide a test sample sheet for measuring the anti-static property as well as conducting the Izod impact test at a temperature of 240° C. The surface resistibility, the static charge, the ash attraction, the Izod impact value, and the thermal stability of these samples were measured.

Measurements of the surface resistibility and the static charge were conducted according to the manner described in Example 1.

The ash attraction test was conducted by rubbing the surface of the sample with a cotton cloth about 100 times, allowing the surface thus rubbed to approach a height of 5 mm. from an ash prepared by burning a paper, and observing the extent of the attached ash, classified on the basis of the grades A to E, with A representing the least contamination and E the largest contamination.

The thermal stability was measured by heat-treating the sample in an air-circulating dryer at 180° C. for 1 hour and observing the extent of discoloration. The numerical values given in Table 5 show the extent of the discoloration.

The impact value was obtained by measuring the notched Izod impact value at 20° C. and 65% RH.

The results obtained are shown in Table 5 together with the results on reference samples containing commercially available compounds as well as an analogous compound having a similar structure to the compounds of this invention.

TABLE 5

| | Anti-static agent | Addition amount (PHR) | Surface resistibility (Ω) | Half Life period of charge decay (sec.) | Ash test | Izod impact value with notch | Heat stability discoloration order | |
|---|---|---|---|---|---|---|---|---|
| Compounds according to the present invention. | $n\text{-}C_{18}H_{37}NH\text{-}CH_2CH_2OH=60$ [1] $(n\text{-}C_{18}H_{37})_2N\text{-}CH_2CH_2OH=40$ | 1<br>2 | $1.6 \times 10^{13}$<br>$4.0 \times 10^{11}$ | 2.7<br>0.8 | A/B<br>A | 20.6<br>20.7 | (2)<br>(2) | } Good. |
| Reference compounds | $n\text{-}C_{12}H_{25}\diagdown\!\!\!\diagup\text{CH}_2\text{CH}_2\text{OH}$ H | 1<br>2 | $4.6 \times 10^{15}$<br>$1.3 \times 10^{14}$ | ∞<br>∞ | D<br>C/D | 19.8<br>19.6 | (5)<br>(5) | } Bad. |
| | $n\text{-}C_{18}H_{37}N\diagdown\!\!\!\diagup\begin{array}{l}CH_2CH_2OH\\CH_2CH_2OH\end{array}$ | 1<br>2 | $3.6 \times 10^{15}$<br>$4.4 \times 10^{13}$ | ∞<br>4.0 | B/C<br>A | 19.9<br>19.6 | (3)<br>(4) | } Fairly good. |
| | Commercially available alkylamine ethyleneoxide adduct. | 1<br>2 | $1.2 \times 10^{14}$<br>$7.8 \times 10^{13}$ | ∞<br>27.0 | B/C<br>C/B | 20.8<br>20.9 | (5)<br>(5) | } Bad. |
| Control | | 0 | $9.8 \times 10^{15}$ | | E | 18.9 | (1) | |

[1] Weight percent.

From the results shown in Table 5 it can be seen that the ABS resin containing N-(2-hydroxyethyl)stearylamine is particularly superior in heat discoloration than the resin containing N,N-bis(2-hydroxyethyl)stearylamine which is considered to be a typical conventional anti-static agent. Also, the resin of this invention is excellent in surface resistibility, in half life of static charge, and in ash attraction test in comparison with the reference samples. In addition, it was confirmed that sufficient anti-static effect can be achieved with the resin of this invention notwithstanding the lesser amount of the additive employed. Furthermore, by the addition of the agent of this invention, the impact strength was somewhat increased.

EXAMPLE 9

A mixture of 100 parts by weight of an ABS resin, Kralastic (registered trade name, made by the Sumitomo Chemical Co.) and 2 g. of the product prepared in Example 6 was roll-milled for 10 minutes at 160° C. and the milled mixture was press molded for 10 minutes at a pressure of 100 kg./cm.² and at a temperature of 170° C. to provide a sheet. The properties of the sample were evaluated in the manner described in Example 1. The surface resistibility, the static potential, the half life of static charge and the carbon-contamination degree were 3.2×10¹²Ω, 57, 15 seconds, and A/B respectively.

EXAMPLE 10

According to the procedure described in Example 1, 178 g. of a white waxy product was prepared from 210 g. of monoethanolamine and 180 g. of stearyl chloride. The melting point of the product was 51–53° C. and the total amine value, the tertiary amine value, and the primary amine value of the product were 154, 24.6, and 0 respectively.

From these amine values the composition of the product was calculated to be 59.7% by weight of the monoalkylamine, N-(2-hydroxyethyl)stearylamine, and 37.1% by weight of the dialkylamine, N,N-bis-stearyl-2-ethanolamine.

89 g. of the product were distilled under a reduced pressure, and 45 g. of N-(2-hydroxyethyl)-stearylamine was obtained. The melting point and the total amine value of the product were 65° C. and 175 (calculated 179) respectively.

A mixture of 100 g. of polystyrene, Esbrite GP-4 (registered trade name, made by the Sumitomo Chemical Co.) and 2.0 g. of a mixed product 59.7% by weight of the monoalkylamine and 37.1% by weight of the dialkylamine was roll-milled at 150° C. and the mixture was hot-pressed for 10 minutes at a pressure of 50 kg./cm.² and at a temperature of 190° C.

Using the purified product obtained on distillation, consisting of 100% monoalkylamine, a sample similar to the above was prepared.

The anti-static properties of these samples were measured. The surface resistibility, the static charge potential, the half life of static charge, and the carbon-contamination degree of the sample containing the mixture of the monoalkylamine and the dialkylamine were $7.0 \times 10^{11}\Omega$, 60, 6.0 seconds, and A, while those of the sample containing the purified product were $1.5 \times 10^{12}\Omega$ 60, 10 seconds and A respectively.

TABLE 6
Composition

| Ingredients: | Parts by weight |
|---|---|
| Esprene 301 | 100 |
| Stearic acid | 1 |
| Zinc oxide | 5 |
| Clay | 80 |
| Process oil | 10 |
| Titanium white | 25 |
| Dicumyl peroxide | 7 |
| Sulfur | 0.3 |
| Anti-static agent | 2 |

TABLE 7

| Anti-static agents | Static charge Potential | Half life of charge decay (sec.) | Carbon contamination, degree | Accelerated degradation test Weather-O-meter (200 hrs.) | Sunlight exposure |
|---|---|---|---|---|---|
| Compound according to this invention: Sample (A) | 47 | 0.5 | A | No discoloration | No discoloration. |
| Reference sample: Sample (C)¹ | 60 | 5.0 | D/E | ...do... | Do. |
| Control | 60 | 5.5 | E | ...do... | Do. |

¹ Commercially available anti-static agent comprising an ester of N,N-di(2-hydroxyethyl)stearylamine as the main component.

The static charge and the carbon contamination were measured by the method as described in Example 1. The accelerated degradation test was carried out using a Weather-O-meter (made by the Shimazu Seisakusho Co.) and also by outdoor exposure.

EXAMPLE 12

Sample compound (A), 2 parts, prepared as in Example 4, and Esprene 301, 100 parts, were compounded, press-vulcanized and evaluated in the manner described in Example 11. The composition used as well as the results of avaluation are shown in Table 8 and Table 9 respectively. As can be seen from Table 9, the test rubber sheet prepared by the sulfur-vulcanization process gave fairly good results.

TABLE 8
Composition

| Ingredients: | Parts by weight |
|---|---|
| Esprene 301 | 100 |
| Stearic acid | 1 |
| Zinc oxide | 5 |
| Clay | 80 |
| Process oil | 10 |
| Titanium white | 25 |
| Zinc di-n-butyldithiocarbonate | 1.5 |
| Tetramethyl thiuram disulfide | 1.5 |
| Mercapto benzothiazole | 1.5 |
| Sulfur | 1.5 |

TABLE 9

| Anti-static agents | Static charge Potential | Half life of charge decay (sec.) | Carbon contamination, degree | Accelerated degradation test Weather-O-meter (200 hrs.) | Sunlight exposure (one month) |
|---|---|---|---|---|---|
| Compound according to this invention: Sample (A) | 50 | 0.6 | A | No discoloration | No discoloration. |
| Reference sample: Sample (C)¹ | 60 | 5.0 | E | ...do... | Do. |
| Control | 60 | 6.0 | E | ...do... | Do. |

¹ Commercially available anti-static agent comprising an ester of N, N-di(2-hydroxyethyl)stearylamine as the main component.

EXAMPLE 11

Sample compound (A), 2 parts, prepared as in Example 4 and EPDM, Esprene 301 (registered trade name, made by the Sumitomo Chemical Co.) 100 parts were compounded as shown in Table 6. The compounding was carried out on a mixing roll at 40–60° C. and the resulting mixture was pressure-vulcanized at 160° C. for 30 min. to give a vulcanized rubber sheet whose static charge, carbon stainability and accelerated degradability, were evaluated as shown in Table 7.

What is claimed is:

1. A polymeric composition having anti-static and anti-fogging properties comprising:
   a polymer selected from the group consisting of
   (1) a polyolefin,
   (2) a copolymer of ethylene and a polar vinyl compound selected from the group consisting of vinyl acetate, vinyl chloride, and an acrylic acid ester, (3) a thermoplastic resin consisting essentially of acrylonitrile, butadiene and styrene,
(4) a polystyrene, and
(5) a synthetic rubber selected from the group consisting of a styrene-butadiene rubber, a polybutadiene rubber, an ethylene-propylene-diene-methylene linkage elastomer, and mixture consisting of about 60% to 80% by weight of at least one anti-static agent selected from the group consisting of N-(2-hydroxyethyl)stearylamine and N-(2-hydroxyethyl)oleylamine, and 40% to 20% by weight of at least one anti-static agent selected from the group consisting of N,N-bis-stearyl-2-ethanolamine and N,N-bis-oleyl-2-ethanolamine, said mixture being present in said composition in an amount of from 0.1 to 5% by weight, based on the the weight of the polymer.

2. The composition as claimed in claim 1, wherein said polyolefin is selected from the group consisting of polyethylene and polypropylene.

References Cited
UNITED STATES PATENTS
3,575,903   4/1971   Rombusch et al. _____ 260—23

JAMES A. SEIDLECK, Primary Examiner
S. M. LEVIN, Assistant Examiner

U.S. Cl. X.R.
260—23.7 M, 80, 78, 85.1, 86.7, 87.3, 87.5 C, 93.5 A, 93.7, 94.7 N, 94.9 GB, DIG. 19